(12) United States Patent
Iijima et al.

(10) Patent No.: US 7,554,686 B2
(45) Date of Patent: Jun. 30, 2009

(54) PRINTING SYSTEM

(75) Inventors: Jun Iijima, Saitama (JP); Keiichi Kobayashi, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 466 days.

(21) Appl. No.: 11/560,278

(22) Filed: Nov. 15, 2006

(65) Prior Publication Data

US 2007/0086040 A1    Apr. 19, 2007

Related U.S. Application Data

(62) Division of application No. 10/230,759, filed on Aug. 28, 2002, now Pat. No. 7,196,810.

(30) Foreign Application Priority Data

Aug. 28, 2001 (JP) ............................. 2001-258714

(51) Int. Cl.
*G06F 15/00* (2006.01)
*H04N 7/18* (2006.01)

(52) U.S. Cl. ..................... 358/1.15; 348/143

(58) Field of Classification Search .............. 358/1.15, 358/406, 442, 434, 504, 518, 520, 1.16, 1.14, 358/906; 348/143, 207.1, 207.2, 207.99, 348/360, 375, 211.3, 305, 234; 386/46, 117; 206/232, 455; 705/1, 19; 382/305

See application file for complete search history.

(56) References Cited

U.S. PATENT DOCUMENTS

| | | | |
|---|---|---|---|
| 5,953,044 A | 9/1999 | Kato et al. | 725/148 |
| 6,636,259 B1 | 10/2003 | Anderson et al. | 348/211.3 |
| 6,909,457 B1 | 6/2005 | Fukasawa | 348/211.11 |
| 2002/0001398 A1 | 1/2002 | Shimano et al. | 382/104 |
| 2002/0032909 A1 | 3/2002 | Shiota et al. | 725/91 |
| 2002/0072935 A1 | 6/2002 | Rowse et al. | 705/4 |
| 2002/0198936 A1 | 12/2002 | McIntyre et al. | 709/203 |
| 2004/0046868 A1 | 3/2004 | Anderson et al. | 348/207.11 |
| 2005/0065857 A1* | 3/2005 | Sakai et al. | 705/26 |

FOREIGN PATENT DOCUMENTS

| | | |
|---|---|---|
| JP | 11-352598 | 12/1999 |
| JP | 2001-078129 | 3/2001 |
| JP | 2001223979 A | 8/2001 |

OTHER PUBLICATIONS

Japanese language office action and its English translation for corresponding Japanese application No. 2005-191362 list the reference above.

* cited by examiner

*Primary Examiner*—Saeid Ebrahimi Dehkordy
(74) *Attorney, Agent, or Firm*—Hogan & Hartson LLP

(57) ABSTRACT

A camera in which is stored a unique ID is directly or indirectly connected to a printing service site, to which log-in is performed using the ID, whereupon an image from the camera is uploaded to the printing service site, and a printing server distinguishes from the ID which camera the image was uploaded. Printing of the uploaded image can instructed via the printing service site. At the time of printing, when the printing server is calculating the printing charge, the charge is discounted if the image was obtained from a prescribed camera. Alternatively, if the image to be printed was photographed by a camera of a specific manufacturer, a cash-back is issued to the manufacturer in accordance with the number of prints.

7 Claims, 15 Drawing Sheets

| SHOP NAMES | ADDRESSES | DESTINATION ADDRESSES |
|---|---|---|
| | | |
| | | |
| | | |
| | | |

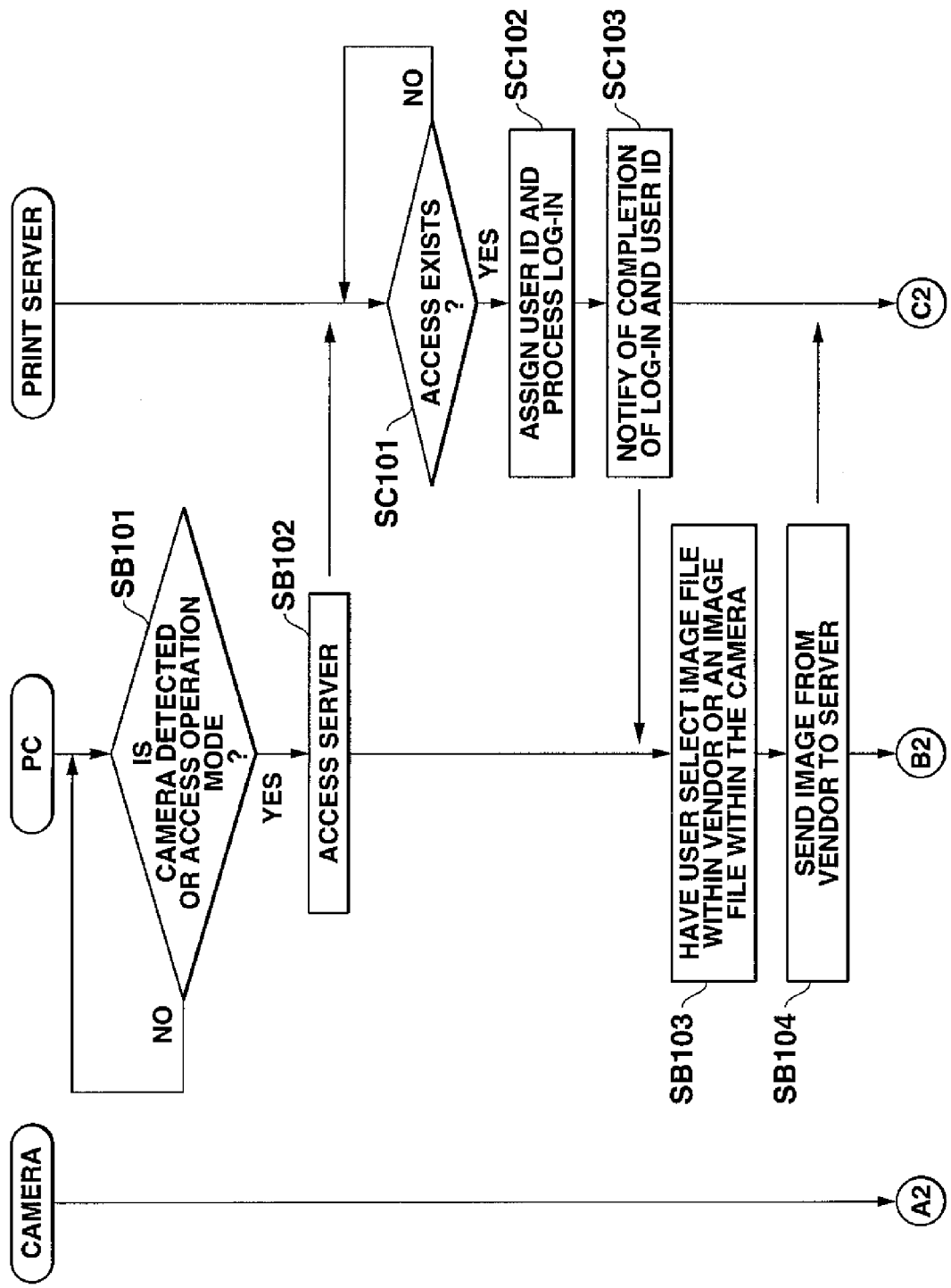

PRINTING SYSTEM

RELATED APPLICATION

This is a divisional of application Ser. No. 10/230,759 filed on Aug. 28, 2002, which claims priority under 35 USC 119 in Japanese Patent Application No. 2001-258714, filed on Aug. 28, 2001, which applications are incorporated by reference in their entireties.

FIELD OF THE INVENTION

The present invention relates to a printing system for printing photographs taken with a digital camera.

DESCRIPTION OF RELATED ART

In a conventional printing service for printing image data acquired and recorded by a digital camera as a photograph (hereinafter referred to simply as a printing service), with the exception of a case in which the printing charge is discounted if the number of prints made is above a prescribed number, all users are given basically a uniform level of service.

However, in the above-noted case in which all users are provided with a uniform level of service, because there is no direct relationship between the printing service and the sales of camera equipment, as seen from the service providing entity, attempts to establish some form of advantage to users who purchase digital cameras and the like from that entity are not successful. Given this situation, it was not possible for the service provider to distinguish the service it provides from the service provided by a competitor.

SUMMARY OF THE INVENTION

In view of the above, a first aspect of the present invention provides a printing system having at least one printing device selected from a group consisting of a plurality of print terminals and a plurality of print vendors, the printing device being connected to a communication network, and a print server connected to the communication network, wherein the print server is adapted to receive image files acquired by a camera and an ID of the camera, and adapted to communicate with the printing device via the communication network, the print server containing a camera ID database storing a specified plurality of camera IDs associated with a plurality of digital cameras.

In another aspect of a printing system of the present invention, an image file stored in the image memory of the digital camera has a prescribed format having image data and additional data. The prescribed format can be, for example, JPEG. In this aspect, the print server further has a number of times management file, and the camera ID database has IDs that identify digital cameras sold by a manufacturer having a tie-up with the service provider and names of manufacturers which sell the digital cameras. The bonus image file storage area in this aspect of the present invention has camera IDs and image data acquired by operation of digital cameras to which camera IDs are assigned. The general image file storage area has user IDs and associated image data, and the number of usage times management file has manufacturer names and associated number of print data.

In another aspect, the present invention provides a method for use with a printing system, including connecting at least one printing device selected from a group consisting of a plurality of print terminals and a plurality of print vendors to a communication network, and connecting a print server to the communication network, wherein the print server is adapted to receive image files acquired by a camera and an ID of the camera, and adapted to communicate with the printing device via the communication network, and wherein the print server includes a camera ID database storing a specified plurality of camera IDs associated with a plurality of digital cameras.

Other features and advantages of the present invention will be apparent from the following detailed description, taken in conjunction with the accompanying drawings that illustrate, by way of example, various features of embodiments of the invention.

BRIEF DESCRIPTION OF DRAWINGS

FIG. 14 is a flowchart showing an image saving operation in the print server of FIG. 10 and associated operation of other apparatuses.

DESCRIPTION OF PREFERRED EMBODIMENTS

An embodiment of the present invention is described in detail below with reference to the accompanying drawings.

Figure 1:
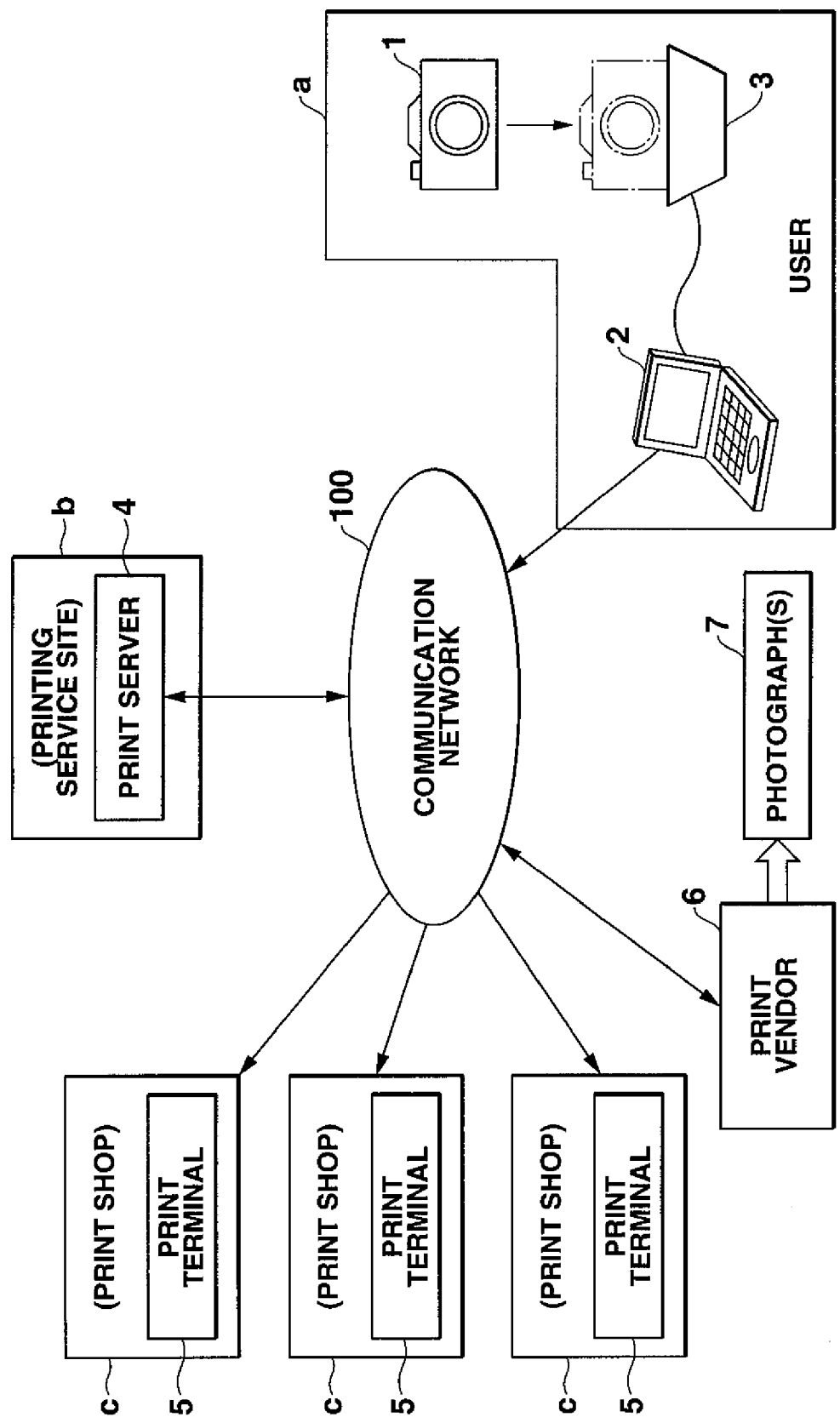
FIG. 1 is a drawing showing the system configuration of a printing service that is common to embodiments of the present invention.

FIG. 1 shows the configuration of a printing system according to a first embodiment of the present invention. This system is a print system for creating photographic prints of image data photographed and recorded by a digital camera 1, and has a digital camera 1, a cradle 3 therefor, a personal computer 2 of a user a, a print server 4 of a service provider operating a printing service site on the Web, print terminals 5, which are installed at a plurality of print shops c cooperating with the service provider b, and a print vendor (photograph vending machine) 6 installed at a location such as a convenience store.

The personal computer 2, the print terminals 5, and the print vendor 6 are connected to the print server 4 via a communication network 100 (the Internet in the case of this embodiment), and the personal computer 2 and cradle 3 are connected via a USB (Universal Serial Bus) cable 3a. The cradle 3 is a docking station for connecting the digital camera 1 to the personal computer 2 as an external device, to which the digital camera 1 is mechanically and electrically connectable and removable, in the same manner as is known for use in the case of a portable information terminal such as a PDA (personal digital assistant) and, with the digital camera in the connected condition, enables data exchange between the personal computer 2 and the digital camera 1.

Figure 2:
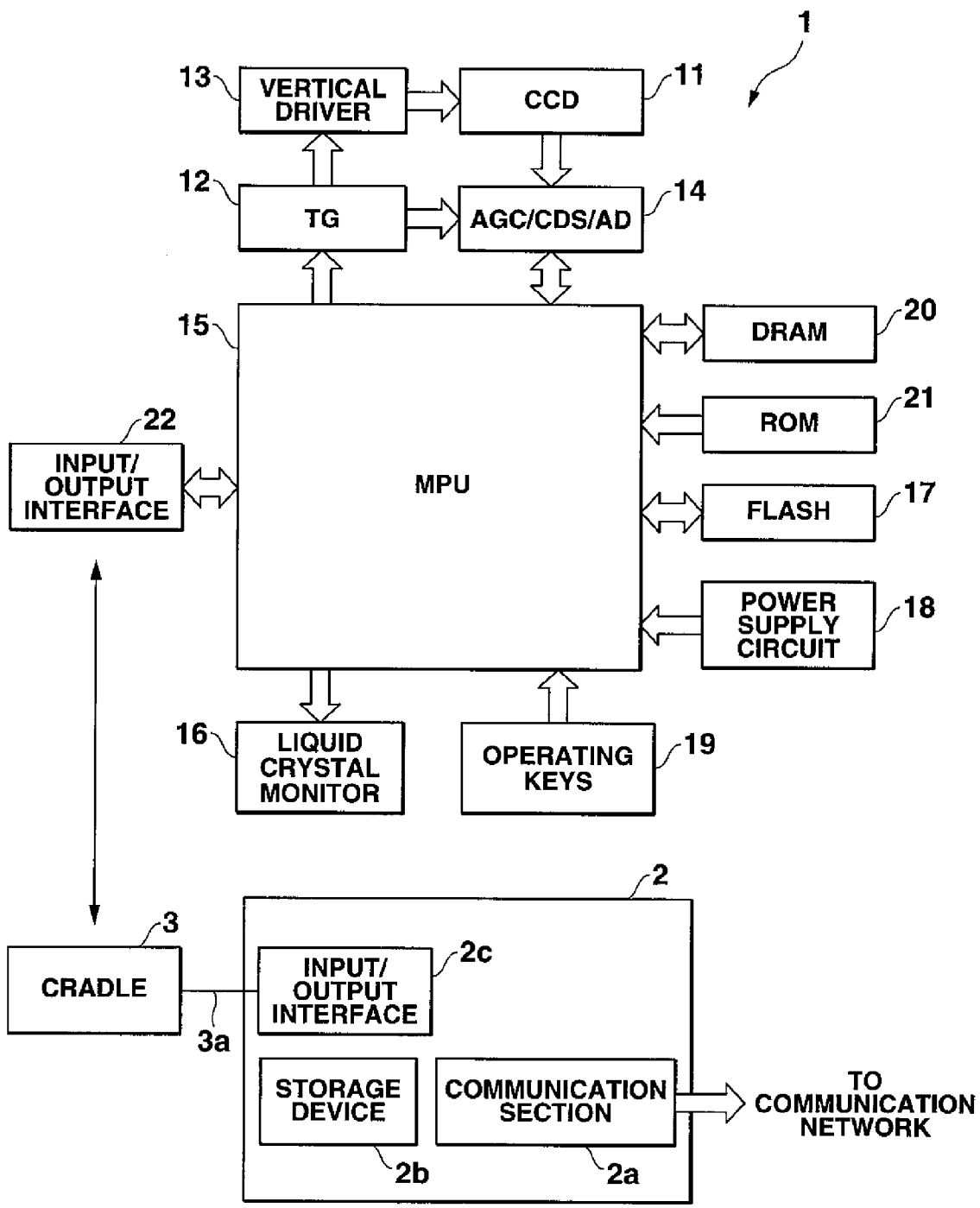
FIG. 2 is a block diagram showing the configuration of a digital camera and the relationship between the digital camera and a personal computer.

FIG. 2 shows the general configuration of the digital camera 1 and the relationship between the digital camera and the personal computer 2 and cradle 3. The digital camera 1, which is marketed by the above-noted service provider, has a CCD (charge-coupled device) 11, which forms an image of an object via a photographic lens (not shown in the drawing), a timing generator (TG) 12, and a vertical driver 13 for driving the CCD 11, and a unit circuit 14, formed by a CDS (correlated double sampling) circuit, which performs correlated double sampling and holds an image-forming signal output from the CCD 11, a gain-adjustment amplifier (AGC), which amplifies the image-forming signal, and an A/D converter, which converts the amplified image-forming signal to a digital signal.

The CCD 11 performs conversion to a charge accumulation time using the timing generator 12 and the vertical driver 13, in response to a shutter pulse sent from an MPU (microprocessing unit) 15, thereby functioning as an electronic shutter. The MPU 15 has functions for performing various signal processing and image processing, generates, via the unit circuit 14, a video signal from the digitally converted image-forming signal, and displays the object photographed by the CCD 11 as a through image on a liquid-crystal monitor 16. At the time of image capture, the image-forming signal is compressed so as to generate an image file having a prescribed format, the file being stored in a flash memory 17. At the time of playback, the compressed image file is decompressed and displayed on the liquid-crystal monitor 16.

Figures 3, 5:
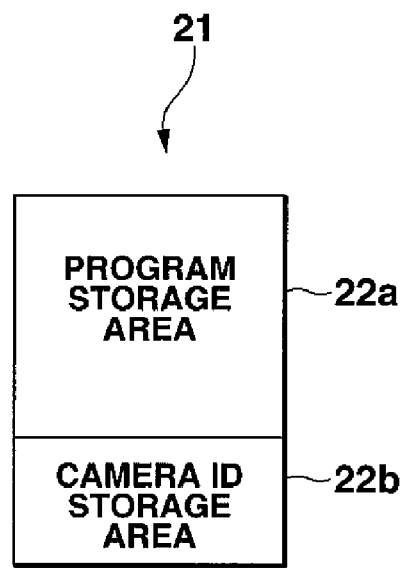
FIG. 3 is a schematic representation of the memory area in a ROM of the digital camera of FIG. 2.
FIG. 5 is a schematic representation of the structure of the print shop database of the print server of FIG. 4.

The MPU 15 has connected to it a power supply circuit 18, which can include a power source such as a battery or the like, an operating key section 19, including such switches as a shutter key or the like, a DRAM (dynamic random-access memory) 20 serving as a working memory, a ROM (read-only memory) 21, and an input/output interface 22 for performing data exchange with the personal computer 2 via the cradle 3. The input/output interface 22 enables exchange of data with the cradle 3, and is provided with a connection terminal which mates with the connecting terminal of the cradle 3. The memory area of the ROM 21 provides a program storage area 21a and a camera ID storage area 21b as shown in FIG. 3, the program storage area 21a having stored in it various operating programs required for control of various parts and data processing by the MPU 15, and the camera ID storage area 21b having stored in it, as identifying information in the present invention, an ID indicating that the digital camera 1 is a specific camera that was sold by the service provider. In this embodiment of the present invention, the camera ID is taken as the manufacturing serial number assigned to the digital camera 1 by the camera manufacturer, this camera ID being stored in the camera ID storage area 21b at the time the digital camera 1 is manufactured. The manufacturing serial number is also marked on the nameplate of the digital camera 1, to enable easy reading from outside the camera. If this is to be avoided, therefore, it is alternately possible to write an arbitrary number different from the manufacturing serial number into the camera ID storage area 21b, notification of this number being given to user by means of a warranty card or the like packed with the digital camera 1. The camera ID is, of course, also known to the service provider. The ROM 21 can be a memory such as an EEPROM (electrically erasable programmable read-only memory) or the like.

The personal computer 2 is a general-type notebook computer having at least a communication section 2a for performing communication with a network, a storage device 2b, such as a hard disk or the like, and an input/output interface 2c enabling a USB connection to the cradle 3. The storage device 2b has installed therein a program for performing data communication with the digital camera 1 via the cradle 3, and a dedicated communication program for making connection to the printing service site b, this program being supplied by the service provider along with the digital camera 1.

Figure 4:
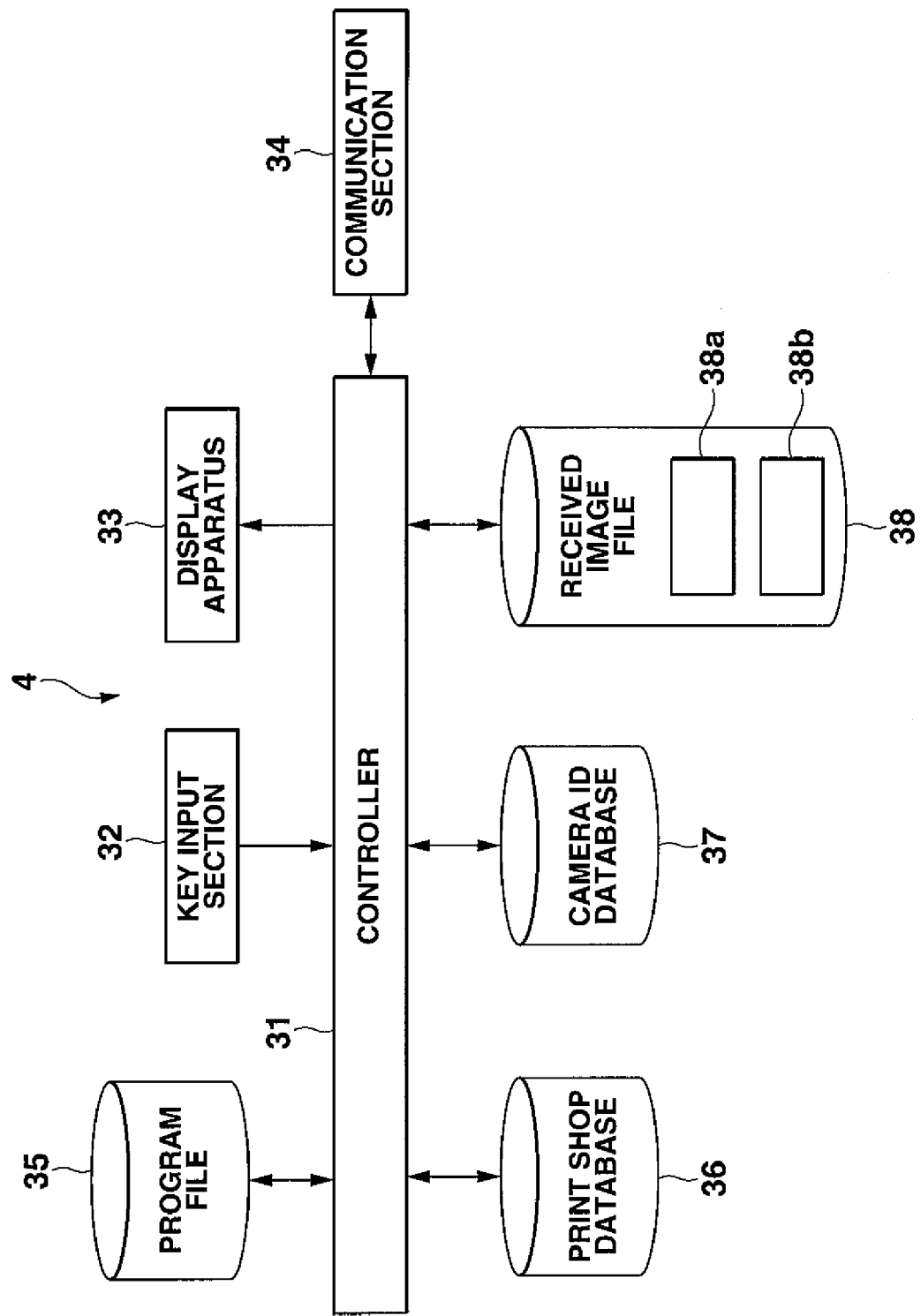
FIG. 4 is a block diagram showing the configuration of a print server according to a first embodiment of the present invention.

FIG. 4 is a block diagram showing the general configuration of the print server 4. The print server 4 has a controller 31 that controls the overall apparatus, a key input section 32 formed by input devices such as a keyboard and mouse, a display apparatus 33 such as a CRT or LCD display or the like, and a communication section 34 for transmitting and receiving data with the above-noted other apparatuses via the Internet 100. The controller 31 is generally made up of a CPU (central processing unit) and working memory, and, in addition to controlling each of the above-noted elements, performs processing such as transfer of various data, calculations, and temporary storage. The key input section 32 and the display apparatus 33 serve as interfaces used by an operator at the print server 4 in performing input and output of various data with respect to the print server 4, and in issuing operating instructions. The controller 31 has connected to it a program file 35, a print shop database 36, a camera ID database 37, and a received image file 38, each of which exists in a storage means (recording medium) such as a hard disk or magneto-optical disk or the like.

Figure 6A:
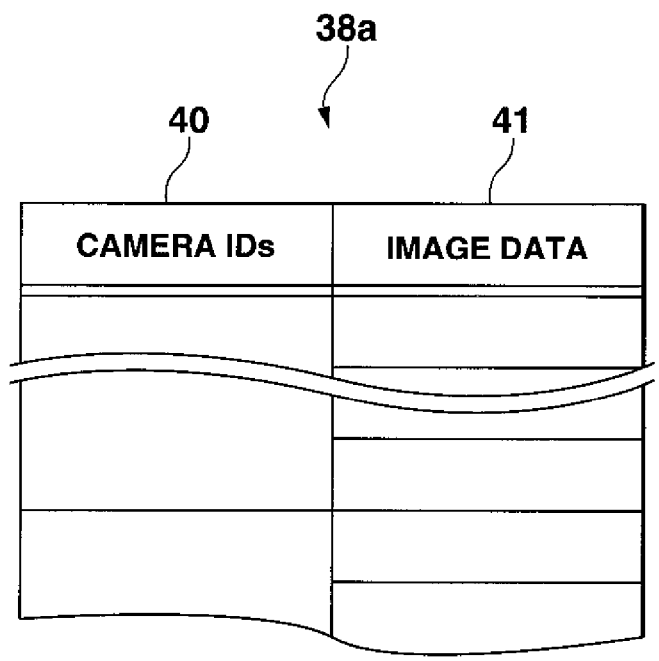
FIG. 6A is a schematic representation of data stored in a received image file of the print server of FIG. 4.
Figure 6B:
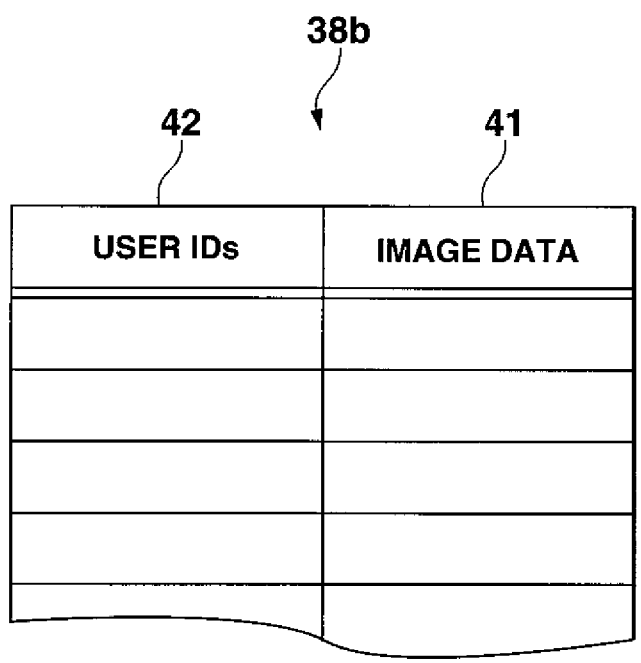
FIG. 6B is a schematic representation of data stored in a received image file of the print server of FIG. 4.

The program file 35 has stored in it an operating program for causing control of various operations in the print server 4. The print shop database 36 is made up of shop names 36a associated with a plurality of print shops c shown in FIG. 1, addresses 36b corresponding thereto, and destination addresses (IP addresses in this embodiment) indicating the print terminals 5 installed thereat. The camera ID database 37 is made up of a plurality of camera ID data assigned beforehand to the digital cameras 1 or the like that are sold by the service provider. The received image file 38 has stored therein a bonus image file storage area 38a and a normal image storage area 38b. The bonus image file storage area 38a, as shown in FIG. 6A, has stored therein camera IDs 40 of the camera ID database 37 and a plurality of associated image data 41 acquired by the process of photographing with the digital cameras 1 having these camera IDs. The normal image file storage area 38b, as shown in FIG. 6B, has stored therein user IDs 42 that are assigned to users as required (users of the printing service who access the printing service site b), and associated image data 41.

Each of the print terminals 5 has a communication section for performing communication with the print server 4, a printer (for example, a high-resolution dye-sublimation printer) for producing high-quality prints based on an image file sent from the print server 4, a CPU 12 controlling these elements, and various storage means for storing a program (not shown in the drawing). The print terminal 5 need not be a stand-alone apparatus, and can alternatively be configured as a personal computer capable of communication with the print server 4, and a printer connected to the personal computer.

The print vendor 6 has a function that, in response to a prescribed operation by a user a, downloads an image file that has been uploaded by the user a in accordance with a procedure to be described below, a function that prints a photograph 7 based on the downloaded image file, and a function that bills a printing charge. More specifically, although not illustrated, this is similar to a cash dispenser installed in a financial institution or the like and has, in addition to a communication section, a printer, and a controller as described above with regard to the printer 5, such elements as pushbuttons for performing the above-noted operations, a CRT, and a section for receiving the billed printing charge.

The operation of a printing system configured as described above is described below for a procedure in the case in which the user a of the digital camera 1 uses the printing service provided by the above-noted service provider. In a printing service using this embodiment of the present invention, the user a first temporarily stores an image file saved in the flash memory 17 of the digital camera 1 into the print server 4, after which the user can then issue an instruction to print the saved image file, the image saving operation and image printing operation of a printing system enabling these operations being described below.

Figure 7:
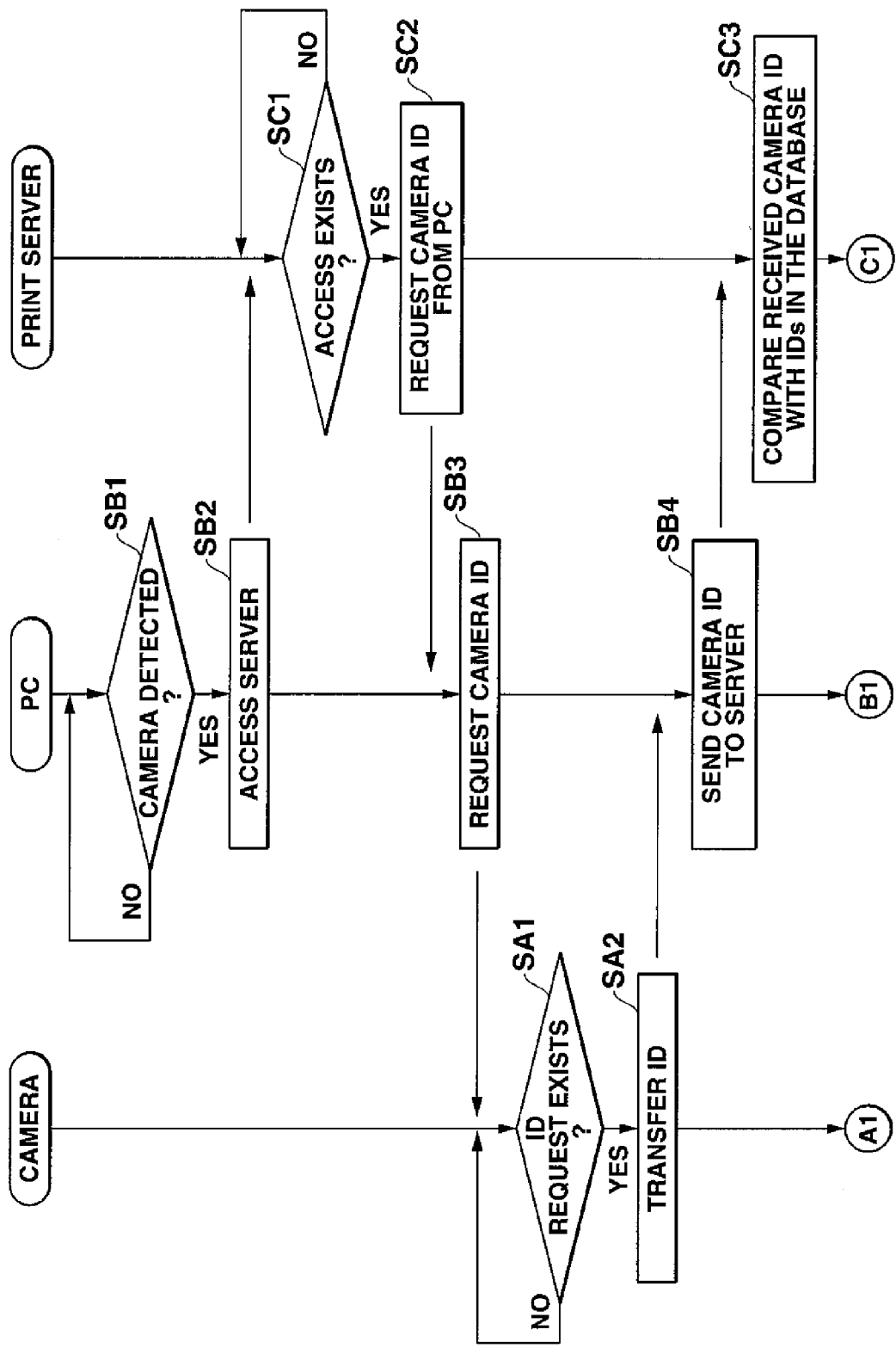
FIG. 7 is a flowchart showing an image saving operation in a system according to the first embodiment of the present invention.
Figure 8:
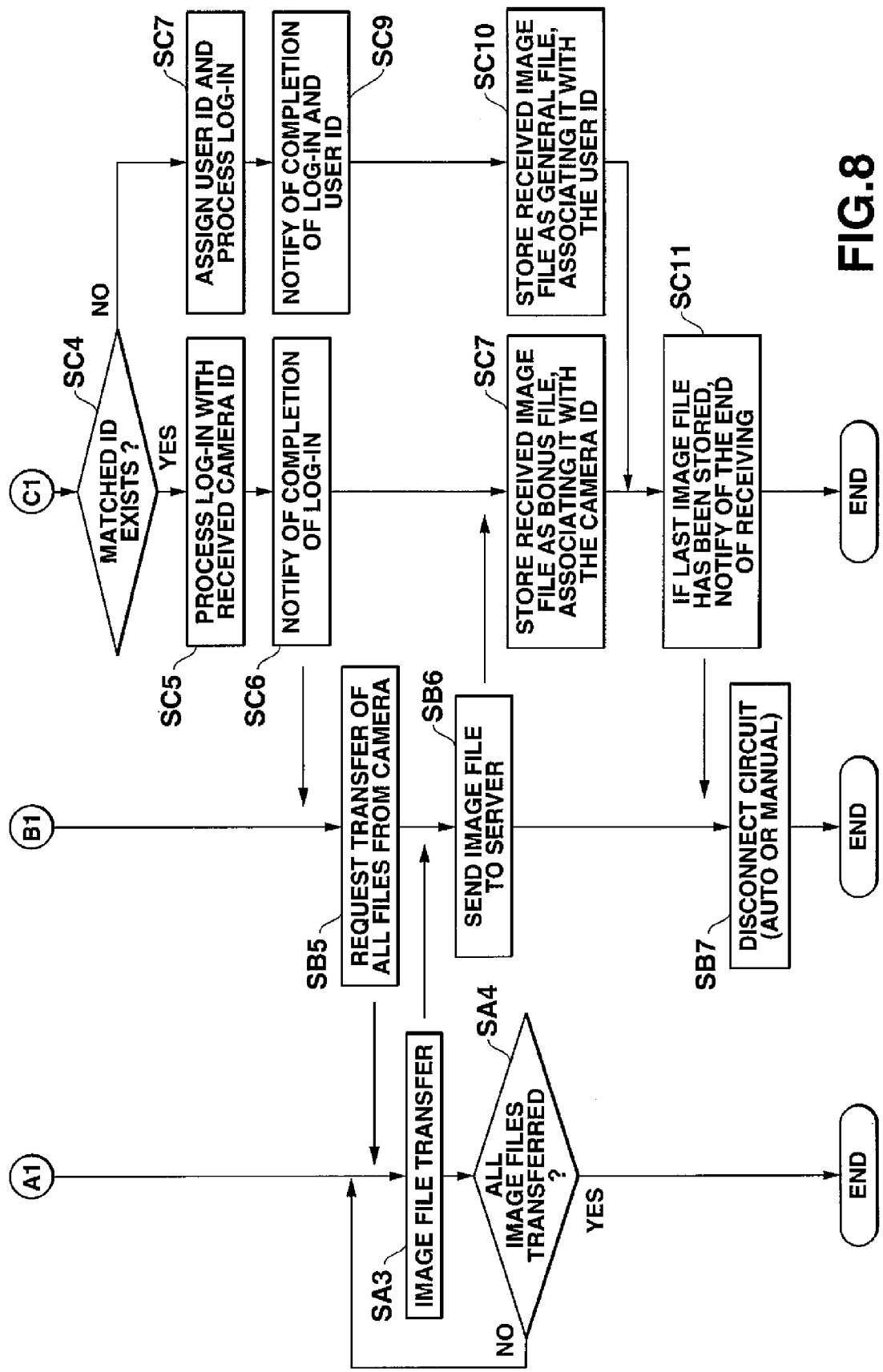
FIG. 8 is a flowchart that is the continuation of the flowchart of FIG. 7.

The procedure of saving an image in the above-described system according to the first embodiment is illustrated in FIG. 7 and FIG. 8. The digital camera 1 is first placed on the cradle 3 and, after the personal computer 2 detects the digital camera 1 (YES result at step SB1), the above-noted dedicated communication program is automatically launched, so as to automatically access a printing service site b on the Web (step SB2). When access occurs from the personal computer 2 (YES result at step SC1), the print server 4 requests the camera ID from the personal computer 2 (step SC2). When this occurs, the personal computer 2 requests the camera ID from the digital camera 1 (step SB3), and the digital camera 1 in response (YES at step SA1) reads the camera ID from the ROM 21 and sends the camera ID to the personal computer 2 (step SA2), whereupon the personal computer 2 transmits the transferred camera ID to the print server 4 (step SB4).

After the above, the print server 4 compares the camera ID received from the personal computer 2 with data in the camera ID database 37 so as to verify whether or not the digital camera 1 connected to the personal computer 2 via the cradle 3 was sold by a the service provider or by a manufacturer having a tie-up with the service provider (step SC3). If the camera ID matches a camera ID in the camera ID database 37 (YES result at step SC4), after performing a log-in procedure that identifies the received camera ID as a user-specifying ID (step SC5), the fact that this has been completed is notified to the personal computer 2 (step SC6).

When the log-in is completed, the personal computer 2 requests the digital camera 1 to transfer all of the stored image files (step SB5), and the digital camera 1 sequentially calls all of the image files saved in the flash memory 17 and transfers the image files to the personal computer 2 (step SA3), this being done for all image files (step SA4). During this time, the personal computer 2 sequentially sends files transferred from the digital camera 1 to the print server 4 (step SB6). When this is done, it is possible to have the personal computer 2 perform processing so as to make the user a perform an operation that selects a prescribed image file, and so that only the selected image file is sent. At the print server 4, the image files sent from the personal computer 2 are stored in the bonus image file storage area 38a of the received image file 38, this storage being performed in a sequence corresponding to the camera IDs verified at the time of log-in (step SC7).

In performing the above-noted processing, if the result of the judgment at step SC4 is NO, for example in the case in which access was by a personal computer or the like other than the above-noted personal computer 2, and it was not possible to receive the camera ID, or when the received camera ID does not exist in the camera ID database 37, the print server 4 assigns a new user ID and performs log-in processing (step SC8). The fact that this has been completed is notified to the personal computer 2 along with the assigned user ID (step SC9). An image file subsequently sent in the same manner as in the case of the above-noted other personal computer or the like is stored into the normal image file storage area 38b in association with the above-noted user ID (step SC10). Thus, image files acquired by cameras other than those sold by the service provider operating the printing service site b are stored as normal image files.

When the storage of the last image file is completed, the print server 4 notifies the personal computer 2 that the reception of image files has been completed (step SC11), in response to which the personal computer 2 disconnects the circuit (step SB7).

After performing the above operation in the first embodiment, a printing operation occurs if there is a printing instruction from the personal computer 2 with regard to an image file (image data 41) stored in either the bonus image file storage area 38a or the general image file storage area 38b of the above-described received image file 38, at which point the print server 4 performs the following operation.

Figure 9:
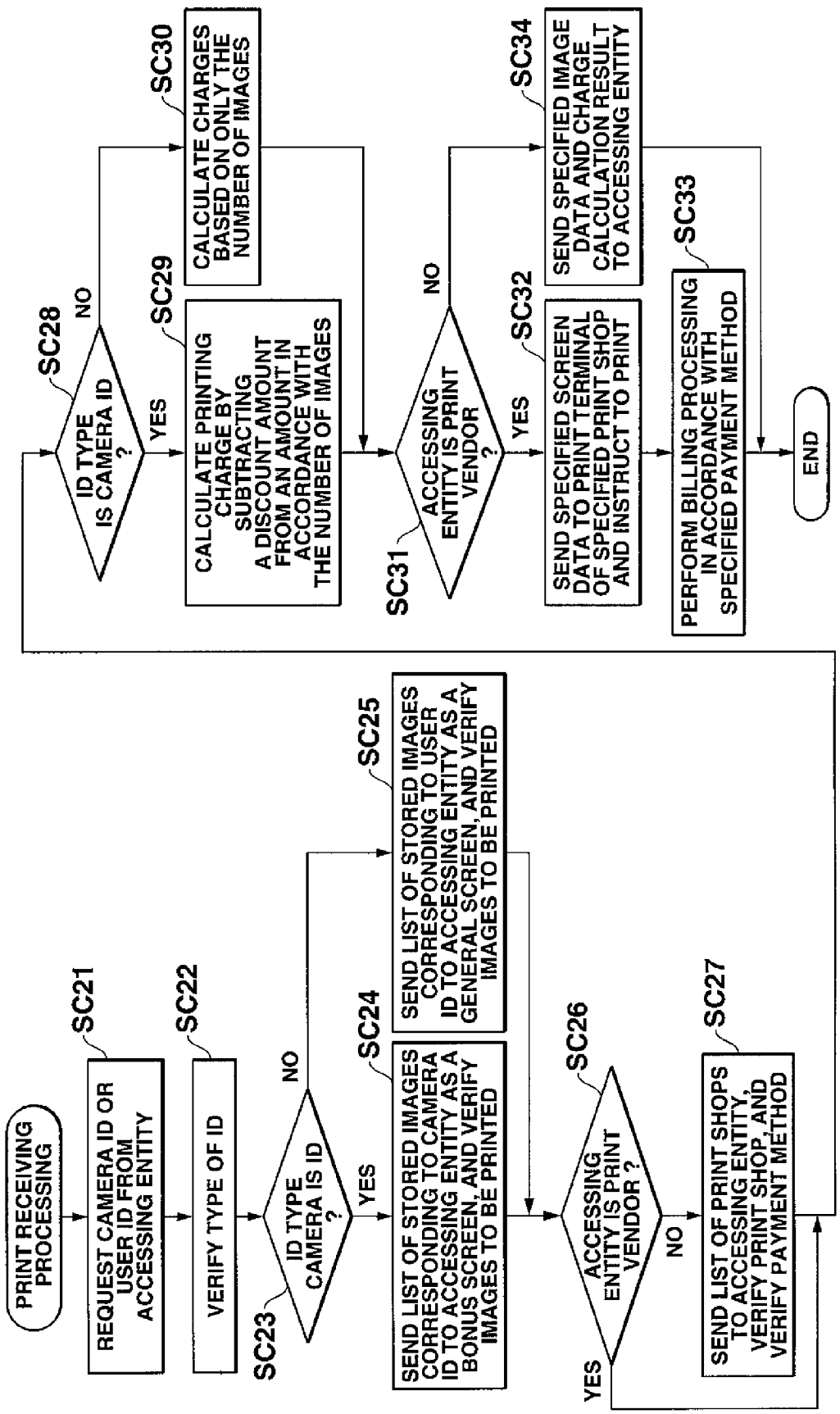
FIG. 9 is a flowchart showing the procedure for print receipt processing in the print server of FIG. 4.

FIG. 9 is a flowchart illustrating the print receiving processing performed by the print server 4 in the case in which, for example, a user a accesses the printing service site b from a home personal computer 2 and issues an instruction to print an image that has been stored by the above-noted method, or the case in which, for example, the user a operates a print vendor 6 installed in an arbitrary location so as to issue a print instruction.

When there is a print instruction from a personal computer 2 or the like, the print server 4 first requests and receives the camera ID and user ID from the accessing entity (user) (step SC21). That is, the user operating a personal computer 2 or the like is made to input an ID. The type of the ID is then verified (step SC22). When this is done, verification is also done as to whether or not the access is from a print vendor 6. If, for example, the print server 4 is accessed from a print vendor 6, it is made to send a pre-established prescribed identifying code, and this verification is performed by testing whether or not the identifying code was sent from the accessing entity.

If the received ID is a camera ID (YES result at step SC23), listing data for all the image files stored in the bonus image file storage area 38a of the received image file 38 corresponding to the received camera ID is sent to the accessing entity, the user is made to specify a desired image, and the specified image is verified (step SC24). If the received ID was a user ID (NO result at step SC23), list data for all image files stored in the general image file storage area 38b of the received image file storage area 38 corresponding to that user ID is sent to the accessing entity, the accessing entity is made to specify an image to be printed, and the specified image is verified (step SC25).

If the accessing entity was not the print vendor 6 (NO result at step SC26), listing data for print shops stored in the print shop database 36, this being the shop names and associated addresses, is sent to the accessing entity, the user is made to specify a print shop, and the specified print shop is verified (step SC24). If the accessing entity is the print vendor 6 (YES result at step SC26), processing proceeds directly to step SC28.

Next, in the case in which the ID verified at step SC22 was a camera ID (YES result at step SC28), an amount in accordance with the number of images specified at step SC24 (product of the specified quantity and the unit price), less a specified discount amount, is calculated as the printing charge (step SC29). In the case in which the above-noted ID is not a camera ID (NO result at step SC28), an amount in accordance with the number of images specified at step SC24 (product of the specified quantity and the unit price) is calculated as the printing charge (step SC30).

If the accessing entity is not a print vendor 6 (NO result at step SC31), one or a plurality of image files specified by the user at step SC24 or at step SC25 is sent to the print terminal 5 of a print shop specified by the user at step SC27, and an instruction is given for printing (step SC32). By doing this, a photograph based on the image file is printed by the print terminal 5, and the user who gave an instruction from the personal computer 2, for example, can receive the desired photograph at a nearby print shop c.

After the above, billing processing is performed (step SC33) so as to bill the user for the printing charge. This billing processing is dependent upon the billing charge payment method specified at step SC27. For example, if cash on delivery is specified (payment upon receipt of the photographs), the calculation result data from step SC29 or step SC30 is sent to the print terminal 5, and if electronic payment is specified processing to invoice a credit company for payment is performed. In the case of credit card payment, because data such as the credit card number is essential, this data must be reported by the user beforehand when the user specifies the payment method at step SC27.

If the result of the judgment made at step SC31 is YES and the accessing entity is a print vendor 6, one image file or a plurality of image files specified by the user at step SC24 or step SC25 is sent, along with the calculation result data from step SC29 or step SC30, to the print vendor 6 (step SC34). The print vendor 6 collects a charge amount in accordance with the calculation result sent thereto, performs photograph printing based on image data sent from the print server 4, and provides the results of the photograph printing to the user operating the print vendor 6.

In a printing system according to the first embodiment of the present invention, because it is possible when performing printing service to verify whether or not the image files that are to be processed were acquired using a digital camera 1 sold by the service provider, it is possible to establish a special bonus such as a discount on the printing charge billed to only users a of digital cameras 1 sold by the service provider, thereby enabling differentiation with respect to other printing services.

Although in the foregoing description of the first embodiment the benefit to the user a of the digital camera 1 was discussed as a printing charge discount, it will be understood that it is possible to provide another benefit in place of, or in combination with, the printing charge discount. For example, it is possible to provide benefits such as an increase in the storage capacity for each camera ID 40 provided in the bonus image file storage area 38a of the received image file 38, so that the storage capacity for a user a is increased.

The foregoing first embodiment is described for a configuration in which the digital camera 1 is connected to the Internet via a personal computer 2 and a cradle 3, these elements being caused to function as an ordering apparatus of the present invention, with a camera ID stored within the digital camera 1 being sent to the print server 4, different configurations can also be envisioned. An alternate configuration, for example, is one in which the digital camera 1 is provided with its own communication function, the digital camera 1 being connected to a portable telephone apparatus for direct access to the printing service site b, in which case the above-described dedicated communication program can be stored in the ROM 21 of the digital camera 1.

A second embodiment of the present invention having a system configuration similar to that of the first embodiment shown in FIG. 1 is described below, chiefly focusing on its differences with respect to the first embodiment.

In the second embodiment, an image file stored in the flash memory 17 of the digital camera 1 has a prescribed format having image data corresponding to a photographed object and additional data, such as is the case for the JPEG format, the camera ID stored in the camera ID storage area 21b of the ROM 21 being automatically added when the digital camera 1 captures an image.

Figure 10:
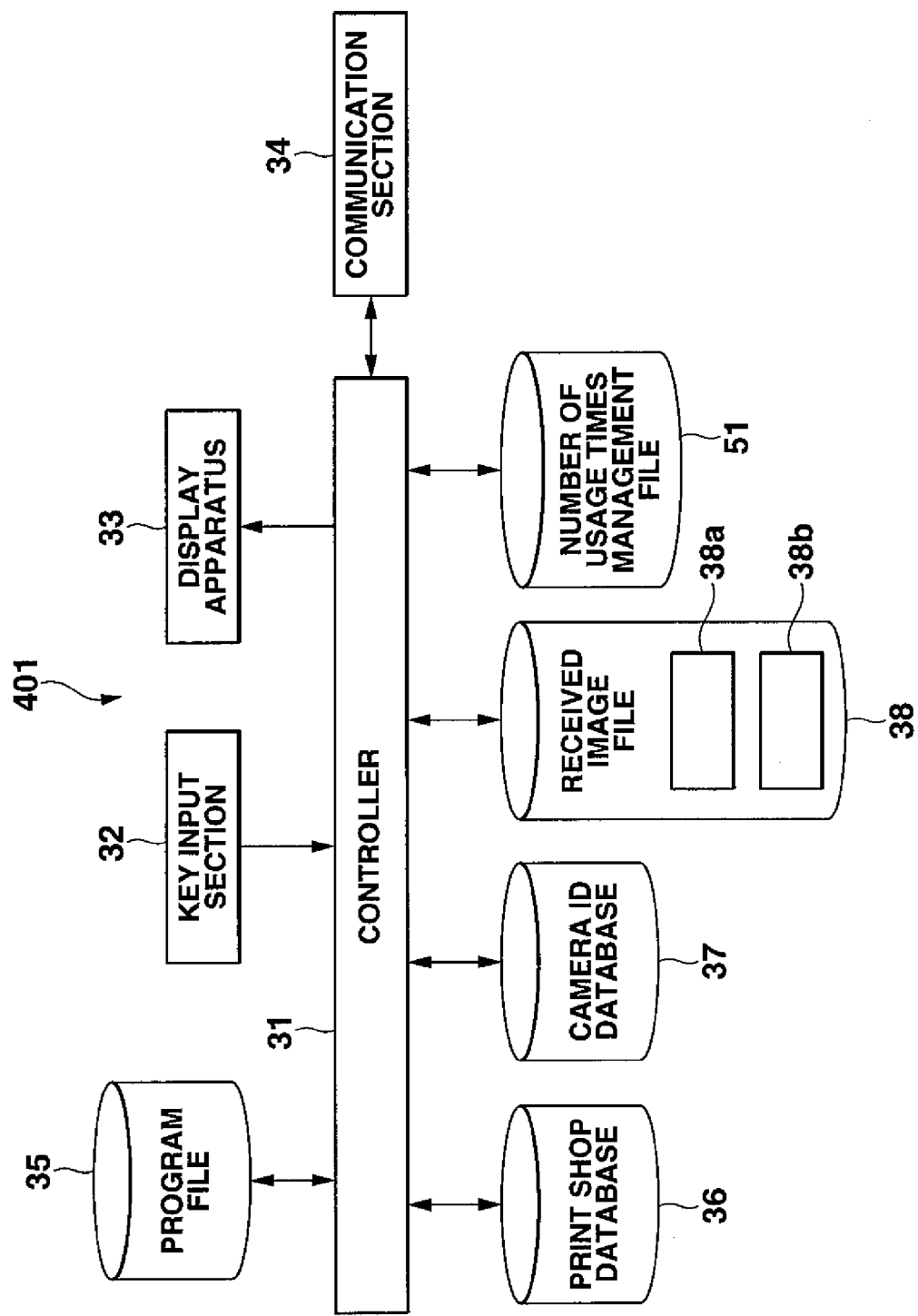
FIG. 10 is a block diagram showing the configuration of a print server according to a second embodiment of the present invention.

FIG. 10 is a block diagram showing the configuration of a print server 401 according to the second embodiment, the print server 401 differing from the print server 4 of the first embodiment in that the print server 401 is provided with a number of usage times management file 51, and in that the above-described program file 35, camera ID database 37, and received image file 38 are made up of data that is different than described previously regarding these elements.

Figure 11:
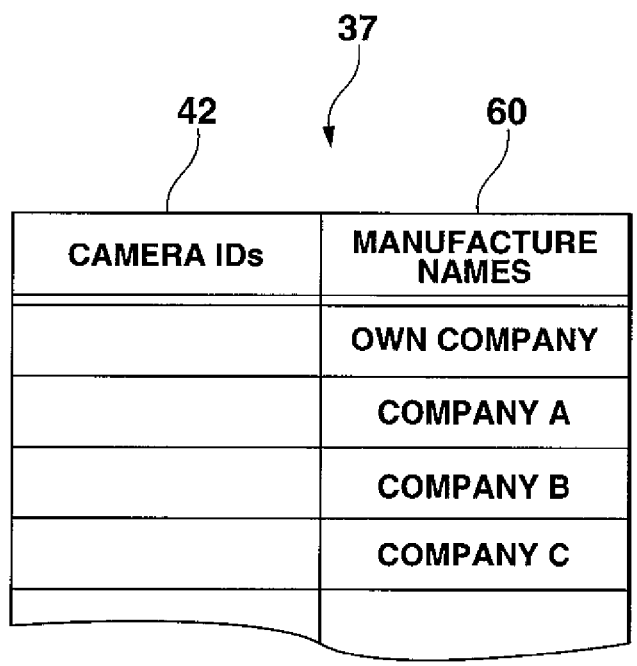
FIG. 11 is a schematic representation of the structure of the camera ID database of the print server of FIG. 10.
Figure 13:
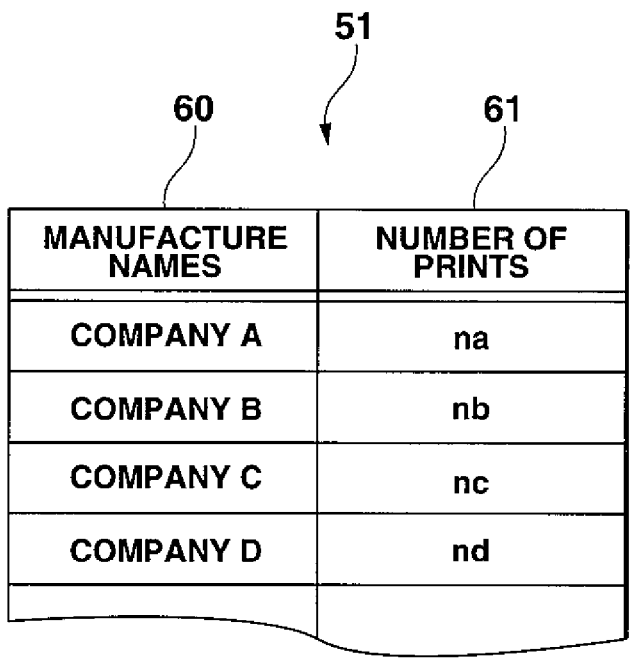
FIG. 13 is a schematic representation of data stored in a usage management file of the print server of FIG. 10.
Figure 12A:
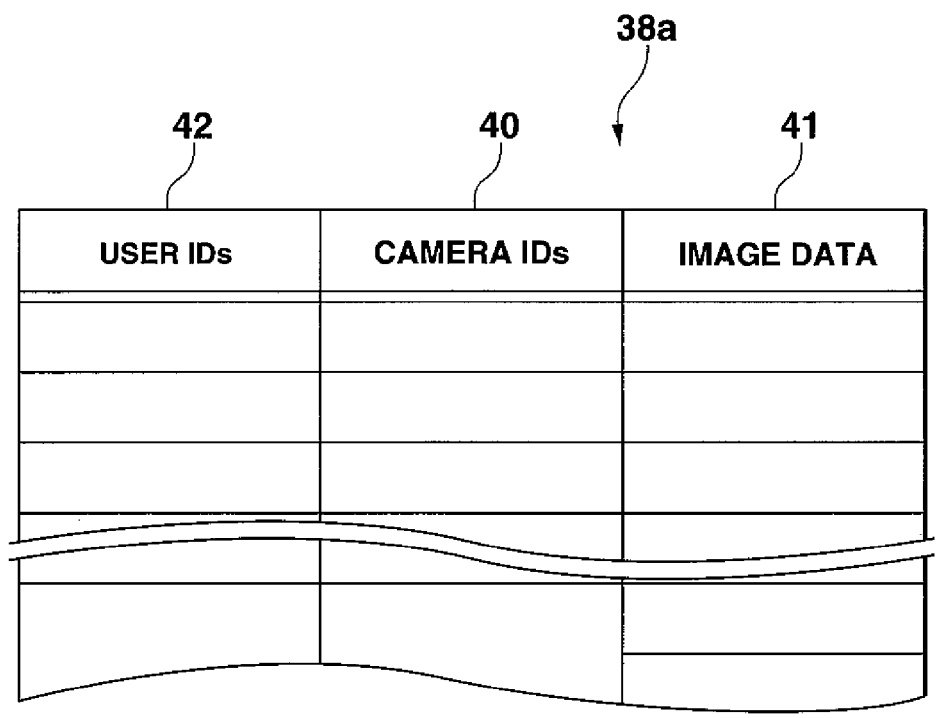
FIG. 12A is a schematic representation of data stored in a received image file in the print server of FIG. 10.
Figure 12B:
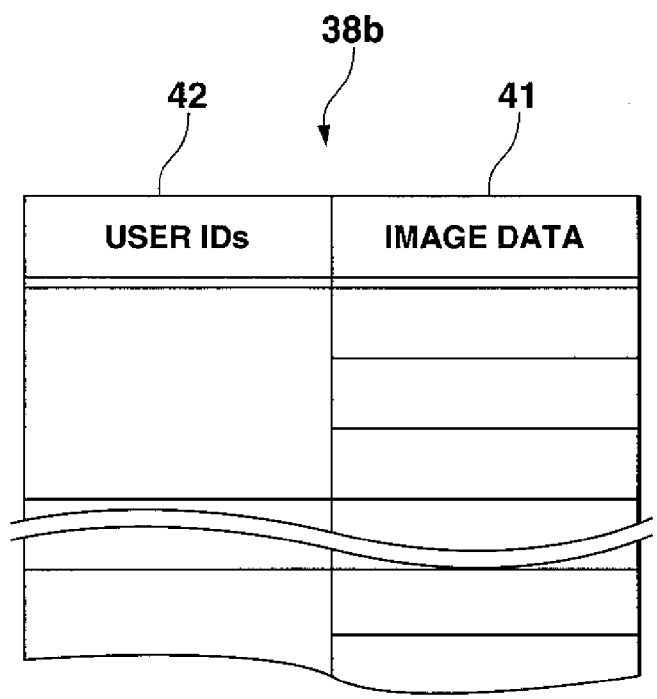
FIG. 12B is a schematic representation of data stored in a received image file in the print server of FIG. 10.

Specifically, in the second embodiment the camera ID database 37, as shown in FIG. 11, has camera IDs 42 for identifying digital cameras sold by a manufacturer having a tie-up with a service provider, and manufacturer names 60 which sell the digital cameras (Own company, Company A, Company B, and so on in FIG. 11). In the bonus image file storage area 38a of the received image file 38, as shown in FIG. 12A, the camera IDs 40 and the image data 41 acquired by photographic operation of the digital cameras 1 to which the camera IDs 42 are assigned are stored in association with user IDs 42 assigned to users (users accessing the printing service site b and using the printing service). In the general image file storage area 38b, as shown in FIG. 12B, the user IDs 42 and associated image data 41 are stored. In the number of usage times management file 51, as shown in FIG. 13, the manufacturer names 60 (other than "Own Company") stored in the camera ID database 37 and associated number of prints data 61 are stored.

The operation of a printing system configured as described above is described below for the case in which a user a of the digital camera 1 uses the printing service provided by the above-noted service provider. In a printing service using the second embodiment of the present invention, similar to the case of the first embodiment, the user a first temporarily stores an image file saved in the flash memory 17 of the digital camera 1 into the print server 401, after which the user a can then issues a instruction to print the saved image file, the image saving operation and image printing operation of a printing system enabling these operations being described below.

Figure 15:
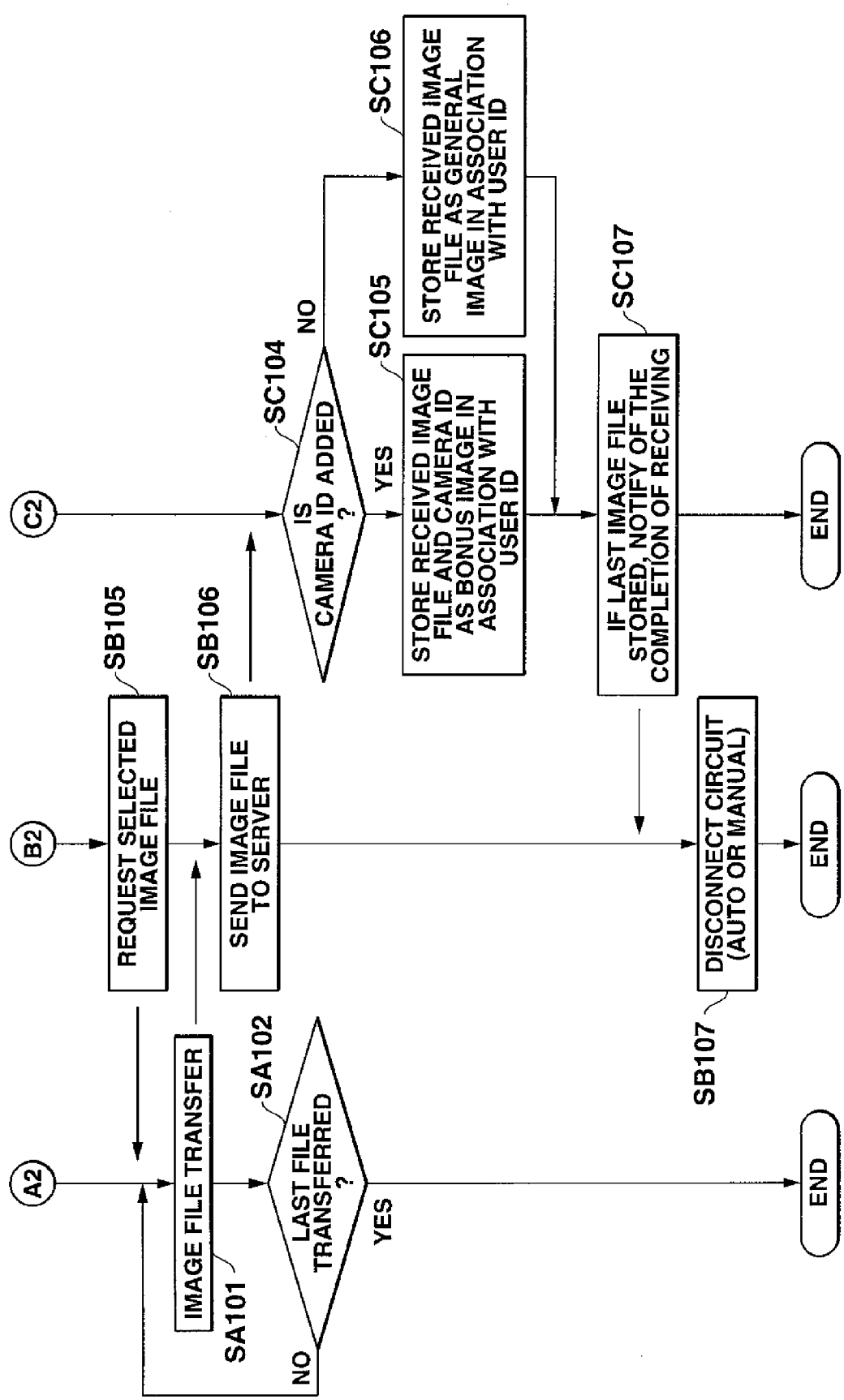
FIG. 15 is a flowchart that is the continuation of the flowchart of FIG. 14.

The procedure for saving an image in the above-described system according to the second embodiment is illustrated in the flowcharts of FIG. 14 and FIG. 15. The digital camera 1 is first rested onto the cradle 3 and, after the personal computer 2 detects the digital camera 1 (YES result at step SB101), the above-noted dedicated communication program is automatically launched, so as to automatically access a printing service site b on the Web (step SB102). At the personal computer 2, if the user a performs an accessing operation to launch a prescribed browser and specifies a prescribed URL (YES result at step SB101), the printing service site b is also accessed (step SB102). When access occurs from the personal computer 2 (YES result at step SC101), the print server 401 requests the camera ID from the accessing personal computer 2 (accessing entity) (step SC102). When this occurs, the personal computer 2 assigns a user ID to the personal computer 2, performs log-in processing (step SC102), and when the log-in processing is completed sends the assigned user ID to the personal computer 2 (step SC103).

When the log-in is completed, the personal computer 2 requests the user a to select a desired image from image files stored in the flash memory 17 of the digital camera 1 or another image file stored automatically in a vendor machine (for example, an image file or the like that had been copied from the digital camera 1 beforehand) (step SB103). When causing the user a to select an image file from within the digital camera 1, it is necessary to cause the personal computer 2 to acquire from the digital camera 1 listing data for image files stored in the flash memory 17 beforehand. Of the selected image files the personal computer 2 sends an image file within the vendor machine to the print server 401 (step SB104), and then requests the digital camera 1 to transfer the selected if (step SB105). The digital camera 1 sequentially calls the image files stored in the flash memory 17 and sends them to the personal computer 2 (step SA101), this being performed for all the requested image files (step SA102). During this time, the image files transferred from the digital camera 1 are sequentially sent to the print server 401 (step SB106) by the personal computer 2.

At the print server 401, each time an image file is received from the personal computer 2 a verification is made as to whether or not an encrypted camera ID is added to the received image file and, if an encrypted camera ID has been added (YES result at step SC104), the image file is stored in the bonus image file storage area 38a of the received image file 38, along with an associated user ID assigned at the time of log-in and the verified camera ID, these being stored successively for all the files (step SC105), thereby being stored as bonus images. If a camera ID had not been added to the received image file, (NO result at step SC104), the image file is stored in the general image file storage area 38b in association with the above-noted user ID (step SC106). Thus, image files acquired from a camera other than a digital camera 1 sold by the service provider operating the printing service site b are stored as general images. When this is done, the image included in the received image file is stored in place of the received image file.

When the last image file storage is completed, the print server 401 notifies the personal computer 2 that the image file reception has been completed (step SC107), in response to which the personal computer 2 automatically, or in response to an operation performed by the user a, disconnects the circuit (step SB107).

In the printing phase of the second embodiment, after performing the above-noted operations, at the printing service site b, if there is a print instruction from the personal computer 2 or the like for an image file stored in either the bonus image file storage area 38a or general image file storage area 38b of the received image file 38 of the print server 401, the print server 401 performs the following operations.

Figure 16:
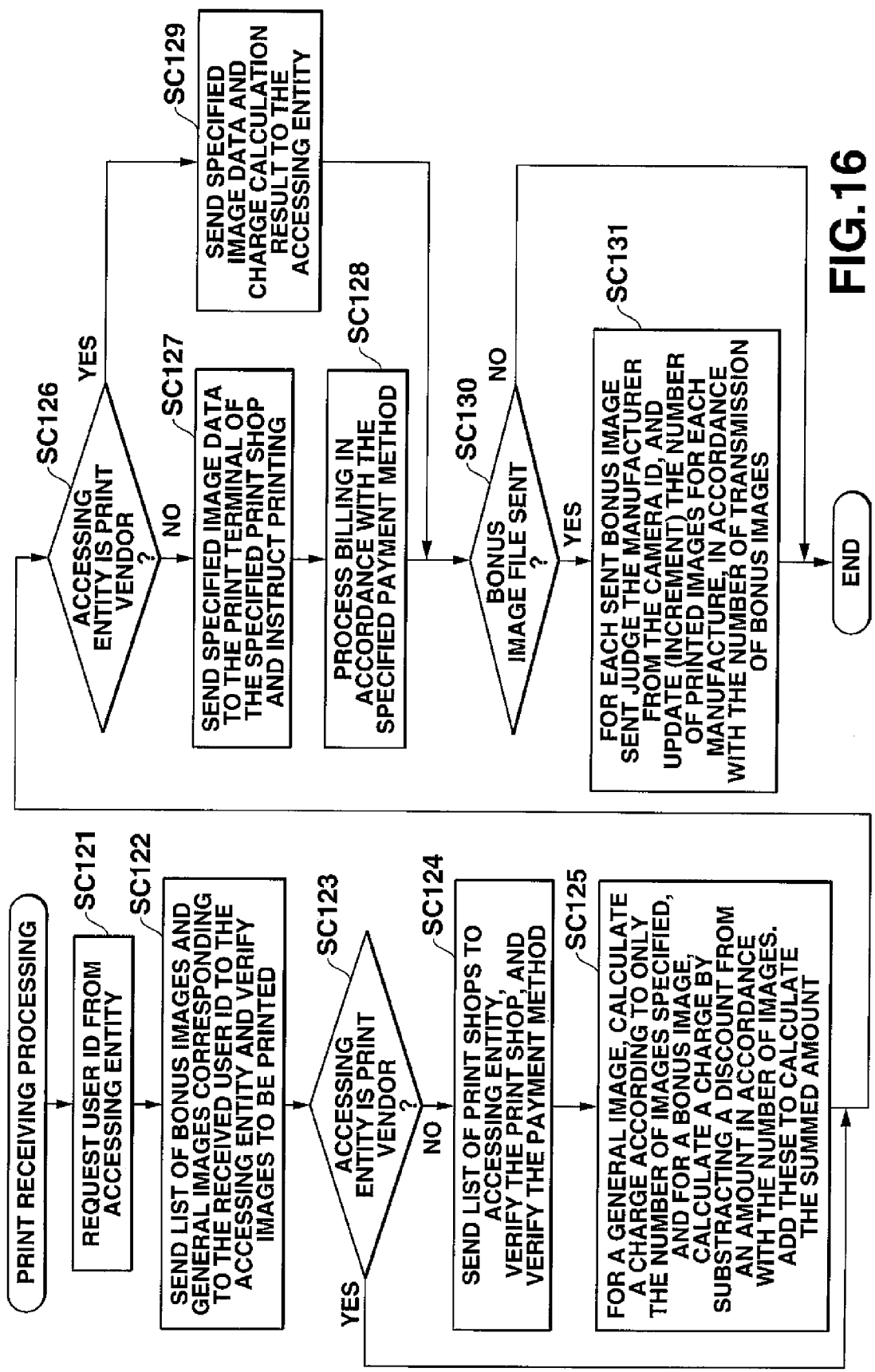
FIG. 16 is a flowchart showing a procedure for print receipt processing in the print server of FIG. 10.

FIG. 16 is a flowchart illustrating the procedure for print receiving processing performed by the print server 401 when access is made of the printing service site b from a home personal computer 2, in the case in which the user a accesses the printing service site b from a home personal computer 2 and issues an instruction to print an image that had been stored by the above-noted method, or the case in which, for example, the user a operates a print vendor 6 installed in an arbitrary location so as to issue a print instruction.

When there is a print instruction from a personal computer 2 or the like, the print server 401 first requests and receives the user ID from the accessing entity (step SC121). That is, the user operating a personal computer 2 or the like is made to input an ID. When this is done, verification is made as to whether or not the accessing entity is a print vendor 6 is performed, by the method described with regard to the first embodiment. Next, listing data for all the image files stored in the bonus image file storage area 38a and in the general image file storage area 38b, corresponding to the received user ID, is sent to the accessing entity, the user is made to specify an image to printed, and the specified image is verified (step SC122).

Then, if the accessing entity was not a print vendor 6 (NO result at step SC123), a list of print shops recorded in the above-described print shop database 36, this being the shop names 36a and the addresses thereof 36b, is sent to the accessing entity, the user is made to specify a desired print shop, and the specified print shop is verified. At the same time, the user is made to specify a payment method, and verification is made thereof (step SC124). In the case in which the accessing entity is the print vendor 6 (YES result at step SC123), the processing control proceeds directly to step SC125.

Next, the printing charge is calculated (step SC125). At this point, an amount in accordance with the number of general images specified at step SC124 (product of the specified quantity and the unit price) only is calculated, and an amount in accordance with the number of bonus images (product of the specified quantity and the unit price), less a specified discount amount, is calculated, the general image printing charge and the bonus image printing charged being summed to obtain the total printing charge.

If the accessing entity is not a print vendor 6 (NO result at step SC126), one or a plurality of image files specified by the user at step SC122 is sent to the print terminal 5 of a print shop specified by the user at step SC 124, and an instruction is given for printing (step SC127). After this is done, billing processing is performed (step SC128) so as to bill the user for the printing charge. This billing processing, similar to that described with regard to the first embodiment, is dependent upon the billing charge payment method specified at step SC124. By this processing, photograph printing is done by the print terminal 5 based on the image file, and for a print instruction issued from a personal computer 2, it is possible for the user a to received the desired prints at a nearby print shop c.

If the result of the judgment at step SC126 is YES, meaning that the accessing entity was the print vendor 6, one or a plurality of image files specified by the users at step SC122 is sent, together with the calculation result data from step SC125 (step SC129). The print vendor 6 collects a usage charge amount corresponding to the sent calculation results, performs photograph printing based on the image data sent from the print server 401, and provides the results of the photograph printing to the user operating the print vendor 6.

By doing this, it is possible to provide the desired photographs to a user who issues an instruction from a print vendor 6 installed at any location.

Additionally, in the case in which, at step SC127 or at step SC129, if bonus image files have been sent (YES result at step SC130), for each bonus image file (image data 41), based on the corresponding camera ID 40 stored in the bonus image file storage area 38a of the received image file 38, a verification is made by the camera ID database 37 of the manufacturer of the camera with which the image file was acquired and, after incrementing the number of prints data 61 stored in the number of usage times management file 51 (step SC131), the print receiving processing is ended. If a bonus image file was not sent (NO result at step SC130), print receiving processing is immediately ended.

Figure 17:
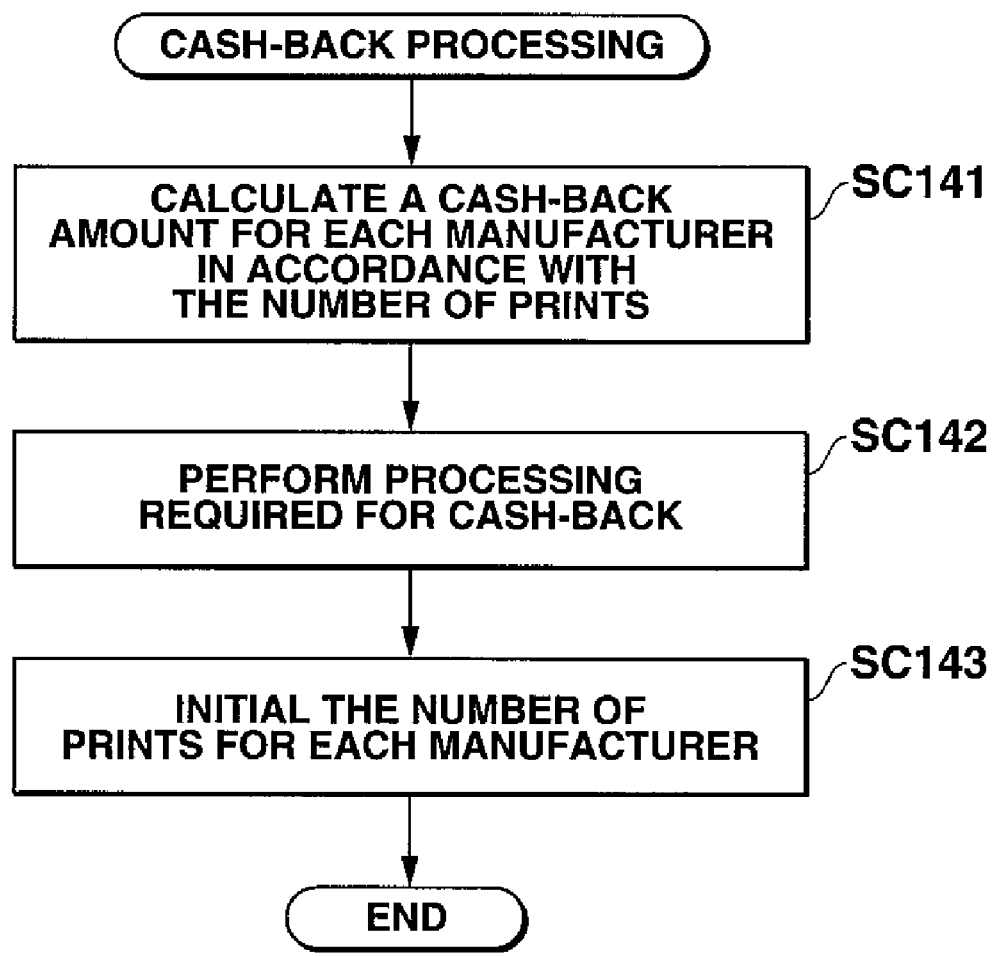
FIG. 17 is a flowchart showing a procedure for cash-back processing in the print server of FIG. 10.

In addition, the print server 401, independently of the above-described print receiving operation in the second embodiment, performs cash-back processing, as shown in FIG. 17, every prescribed period of time (for example, once monthly). In this processing, based on the number of prints data 61 stored in the number of usage times management file 51 a cash-back amount is calculated in accordance with the number of prints with respect to each manufacturer having a tie-up with the system (step SC141), and processing is performed as required to effect the cash-back of the specific amounts for each manufacturer, for example processing of an electronic bank transfer as an electronic transaction (step SC142). The number of prints data 61 stored in the number of usage times management file 51 is then initialized (step SC143).

In a printing system according to the second embodiment, therefore, when performing the printing service, because it is possible to determine whether or not an image file that is to be processed was acquired using a digital camera 1 sold by the service provider or a manufacturer having a tie-up therewith, it is possible to provide the benefit of discounting the printing charge for a user a of a digital camera 1 sold by the service provider or the like. By doing this, it is possible to establish a distinction with respect to other printing services. Additionally, because the level of usage of the printing service (number of prints in the case of this embodiment) is recorded, and a cash-back is made to associated manufacturers, as seen from the service provider, by increasing the number of manufacturers having tie-ups, it is possible to expand the users of the printing service, and as seen from the manufacturers having tie-ups, it is possible to obtain profits from the cash-backs.

In the second embodiment, because the digital camera 1 adds a camera ID assigned to it to an image file, this camera ID being verified by the print server 401 so as to identify the digital camera 1 that was used to acquire the image file, there is the convenience that there is no need have the digital camera 1 at hand when a user a stores the image file in the print server 401. With regard to this feature, it is possible, such as in this embodiment, for the image data and camera ID to be combined as one or, in a system according to a different embodiment, for example, for the digital camera 1 to embed the camera ID in the image data and store this as a image file, with the print server 401 extracting the camera ID from the image file (image data). Other effects and other aspects of this system are the same as described for the first embodiment.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A print server connected to a network, comprising:

a received-image file for storing image data;

data-receipt control means for receiving image data via the network and for storing in the received-image file the received image associated with ID information for identifying an owner of such image data; and print control means for, upon receipt via the network of a request for printing image data with ID information designated, reading out from the received-image file image data associated with the designated ID information to print the read out image data, wherein the data-receipt control means, upon receipt of the image data and a camera ID for identifying a camera used to acquire the image data, stores the camera ID as ID information, associated with the image data in the received image file, and the print control means judges whether or not the designated ID information corresponds to a camera ID identifying a specific camera, and determines whether to provide a predetermined printing service depending on the result of the judgment, a camera ID database including a plurality of camera IDs, which are previously held respectively by a plurality of cameras produced by a plurality of manufacturers, wherein the print control means judges whether or not the designated ID information coincides with any of the camera IDs included in the camera ID database, and determines whether to provide the predetermined printing service depending on the result of the judgment.

2. A print server according to claim 1, wherein the print control means determines to provide the print service at a predetermined discount cost for printing the image data, when the print control means has determined that the designated ID information corresponds to the camera ID for identifying the specific camera.

3. A print server according to claim 2, wherein the data-receipt control means provides a user ID for identifying an owner of image data when no camera ID is received together with the image data, and stores the provided user ID as ID information, associated with the received image data in the received-image file, and the print control means determines not to provide the print service at the predetermined discount cost for printing the image data, when the print control means has determined that the designated ID information corresponds to the user ID decided by the data-receipt control means.

4. A print server according to claim 3, wherein the data-receipt control means notifies, via the network, a source of the image data of the provided user ID.

5. A print server according to claim 2, wherein the print control means judges whether or not a source of a print request for a printing service is a print vendor who can print image data and is available for an automatic printing-cost collection, when the print control means has received such print request, and sends the print vendor the image data corresponding to the designated ID information and calculation of the printing costs, when it has been determined that the source of the print request is the print vendor who can print the image data and is available for the automatic printing cost collection.

6. A print server according to claim 1, further comprising:

a print shop database including a plurality of addresses of print terminals provided in print shops who provide print services of printing image data, wherein the print control means receives information designating a print shop, and reads out from the print-shop database an address of the print shop designated in the received information, when the print control means has received a request for a printing service, and further sends the image data to the read out address of the print shop to make the print shop print the image data.

7. A print server according to claim 1, further comprising:

a camera ID database including the camera IDS associated respectively with plural pieces of information each representing a camera manufacturer of the camera identified by the camera ID; and managing means for designating camera manufacturers of the cameras used to acquire the image data from among the camera ID database, and for instructing the number of image data to be printed with respect to each of the designated camera manufacturers.

\* \* \* \* \*